Oct. 31, 1933.                J. A. HEMPLE                 1,932,732
                        CONTAINER FOR LIVE FISH
                          Filed Jan. 6, 1932
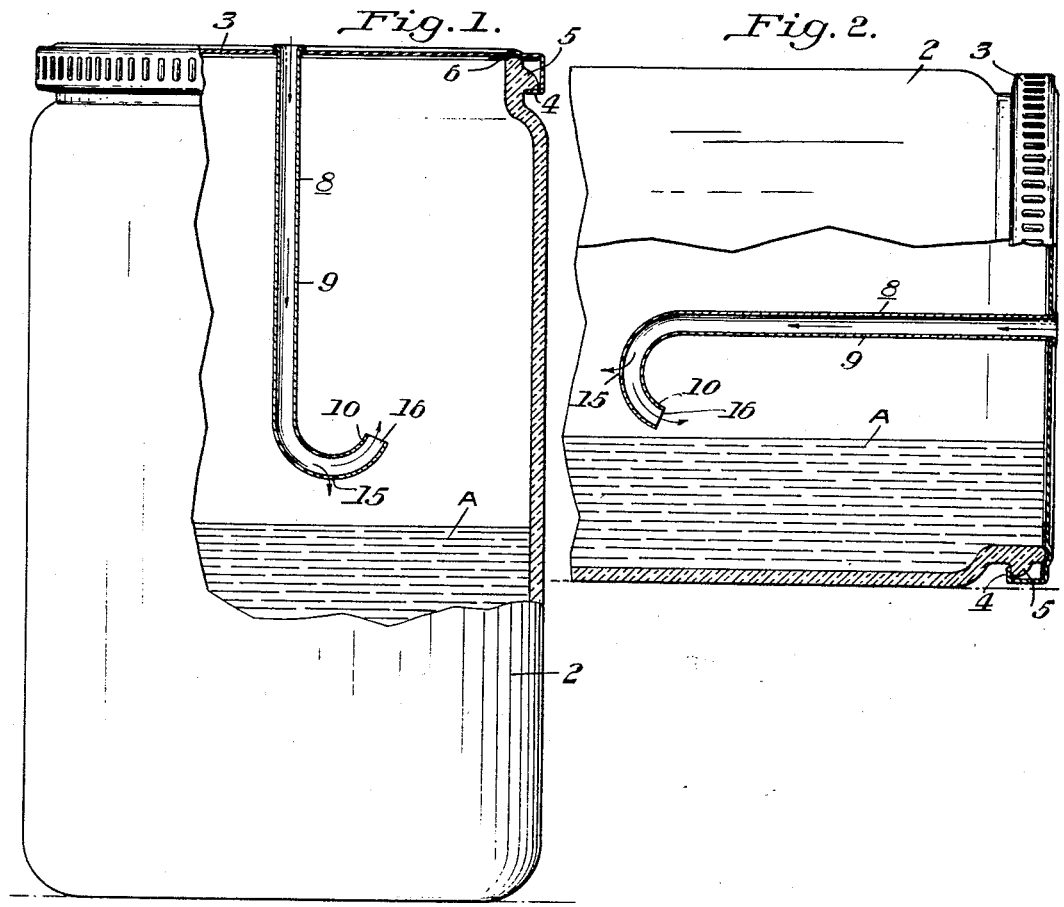
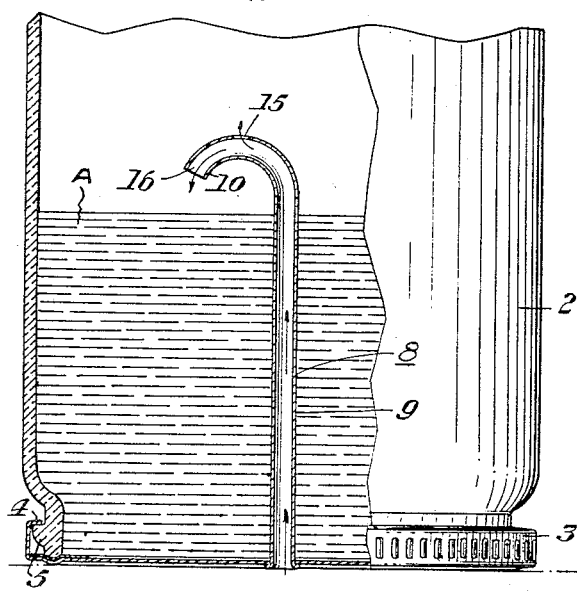
INVENTOR
Joseph A. Hemple
by Byrnes, Stebbins,
Parmelee & Blenko
His Attys.

Patented Oct. 31, 1933

1,932,732

UNITED STATES PATENT OFFICE 1,932,732

CONTAINER FOR LIVE FISH

Joseph A. Hemple, Springfield, Pa., assignor to United States Glass Company, Pittsburgh, Pa., a corporation of Pennsylvania Application January 6, 1932. Serial No. 584,922

1 Claim. (Cl. 119—5)

This invention relates generally to a container for live fish, and more particularly to a container used in storing or shipping live fish where the container is apt to be tipped or inverted while handling.

In shipping or storing live fish, it is desirable to provide some means for preventing the water from leaking from the receptacle when the receptacle is tipped. It is also necessary to provide a means whereby air may be supplied to the receptacle irrespective of the position of the receptacle, whether it be in upright or inverted position or tipped on its side.

According to the present invention, the water is prevented from leaking from the receptacle by a lid or cap which seals the receptacle opening. An air tube extending into the receptacle is so arranged that no matter what the position of the receptacle is, the air tube is open so that air may be supplied to the inside of the receptacle.

In the accompanying drawing, which illustrates a preferred embodiment of my invention, Figure 1 is an elevation of a container in upright position, parts being broken away to show the air tube;

Figure 2 is a view similar to Figure 1 showing the container lying on its side; and Figure 3 is a view similar to Figure 1 showing the container in inverted position.

Referring more particularly to the accompanying drawing, the container comprises a receptacle 2 provided with a lid 3. The receptacle shown is in the form of an ordinary Mason jar, but the invention is applicable irrespective of the shape of the receptacle. The receptacle may, for example, have the shape of an ordinary fish bowl. The lid 3 is of an ordinary construction having a horizontal flange 4 cooperating with a thread 5 formed on the receptacle. A packing ring 6 is inserted between the lid and the top of the receptacle in order to prevent leakage of water.

Secured to the lid is an air tube 8, having a straight portion 9 and an inner end 10 which is curved toward the lid. The air tube 8 is shown as secured to the lid by a spinning operation, but it may be otherwise secured. The inner curved end 10 of the tube is provided with a drain opening 15 which will return to the body A of water in the receptacle any water which splashes into the opening 16.

The inner end of the tube is so arranged that irrespective of the position of the receptacle, the opening 16 will be unobstructed by water and will be free to deliver air into the receptacle. The tube is of such length that the opening 16 is about midway between the top and bottom of the receptacle. This allows the greatest quantity of water to be contained in the receptacle and still leave the opening unobstructed whether the receptacle is in upright or inverted position.

The present invention provides a simple container for storing or transporting live fish in which the water contained in the receptacle is prevented from leaking therefrom, but having provision for supplying air to the receptacle.

I have illustrated and described the present preferred embodiment of my invention. It is to be understood, however, that the invention is not limited to the exact details of construction shown and described but may be otherwise embodied within the scope of the following claim.

I claim:

A container for live fish, comprising a receptacle, a lid sealing the receptacle, and an air tube secured to the lid and extending into the receptacle, the inner end of said tube being curved toward the lid and disposed above the water level so as to admit air but prevent leakage of water irrespective of the position of the receptacle, said curved inner end having a drain opening for returning to the receptacle any water trapped therein.

JOSEPH A. HEMPLE.